Patented Apr. 8, 1930

1,753,255

UNITED STATES PATENT OFFICE

GEORGE MILLER THOMSON, OF CALEDONIA, ONTARIO, CANADA, ASSIGNOR, BY MESNE ASSIGNMENTS, TO CANADA GYPSUM AND ALABASTINE, LIMITED, OF PARIS, ONTARIO, CANADA

PROCESS OF PRODUCING CELLULAR BUILDING MATERIAL

No Drawing.    Application filed December 20, 1926.    Serial No. 156,060.

This invention relates to the production of cellular or porous building material from substances such as gypsum or cements, for example.

The use of such porous material is well known in building construction and the importance of uniformity in the several essential characteristics of the material is well recognized. In the production of the material it is desirable and important that predetermined characteristics, such as, for example, as specific gravity, size of cell, may be readily and accurately imparted to the finished product.

It is thus an object of this invention to provide a process whereby a product of uniform, predetermined character may be readily and economically manufactured.

The natural strength of material, such as plaster of Paris, is greatest. Additions, other than actual reinforcing materials, tend to decrease the strength of the finished product. The tendency is for setting to begin promptly after hydration of the particles of material. It is thus desirable that the hydration be complete, and uniform throughout the mass in point of time. Furthermore, the hydrated material should be given its ultimate form as promptly as possible after treatment, in order that a minimum amount of interruption of initial setting may be effected.

In accordance with this invention, a premade foam of the required density is incorporated in the hydrated material, preferably in such a manner as to preclude the inclusion in the mass of air from the atmosphere.

The foam is preferably made in accordance with the process disclosed in my application filed concurrently herewith Serial Number 156,059, and its density is regulated thereby in accordance with the cell size desired in the porous material. The foam may be mixed with the hydrated material in any desired manner, it being important to see that the mixing is thorough to uniformly distribute the foam in the slurry and to avoid the inclusion in the mixture of air from the atmosphere. It will be apparent that, if volumes of air from the atmosphere are occluded within the mixture, the resulting cells will not have the desired uniformity.

In order to illustrate the manner in which the foam may be mixed with the hydrated material, the following modes of operation are given with respect to the treatment of calcined gypsum which has been uniformly hydrated, thereby producing a slurry.

The slurry and foam are fed into an agitating or mixing chamber where the foam is uniformly distributed throughout the mass of slurry. In order to preclude the inclusion of volumes of air from the atmosphere within the mass, if the agitator or mixer arms are rotated at such a rate as to draw in such air, they should not be exposed thereto. This is essential, particularly at the discharge end of the chamber, since there would be a tendency to break up volumes of air drawn in at the feed end. When a uniform mixture is obtained, the same is discharged from the chamber and run into the forms in any desired way.

The foam may be distributed on the slurry on a "soak-belt", such as is used in gypsum plants for hydrating the calcined material, and mixed therewith by suitable means, care being taken to avoid the inclusion of air from the atmosphere. The slurry and foam from the "soak-belt" may be run into a mixing chamber, such that air will not be drawn into the mass from the atmosphere. From such mixing chamber, the mass may be run into molds to form porous blocks or through the board machine to form boards.

It will be apparent that the specific gravity of the finished material will depend on the density and amount of foam mixed with the slurry.

In order to avoid premature crystal formation or setting, the mixing of the foam with the slurry should proceed during the process of hydration or at any rate it should promptly follow the wetting of the calcined material. It will thus be seen that, in accordance with this invention, no delay in the setting is occasioned by formation of bubbles in the hydrated mass. Moreover, no deleterious or ultimately unnecessary ingredients are introduced into the material and consequently the nearest approach to the natural strength of the material may be obtained without the addition of reinforcing materials. Of course, reinforcing materials may be used when greater strength is required.

It is thought that the operation of the invention will be clearly understood from the above description and inasmuch as various forms of apparatus may be used for operating the process, it is not considered necessary to illustrate the same by drawings.

I claim:

1. A process of making cellular building material comprising hydrating calcined gypsum, and homogeneously distributing throughout said hydrated mass bubbles of substantially uniform size by mechanical agitation in a way to preclude the incorporation therein of volumes of air from the atmosphere other than those admitted to form said uniform bubbles during the mixing process.

2. A process of making cellular building material of uniform porosity which comprises incorporating a premade foam, consisting of bubbles of substantially uniform size, into a slurry of calcined gypsum and preventing the admission thereto of volumes of air from the atmosphere, other than those introduced as foam.

3. A process of making cellular building material comprising hydrating calcined gypsum and homogeneously distributing throughout said hydrated mass bubbles of substantially uniform size by mechanical agitation beneath the surface of the mixture so as to preclude the incorporation in the mass of volumes of air from the atmosphere other than those admitted to form said bubbles during the mixing operation.

In testimony whereof I affix my signature.

GEORGE MILLER THOMSON.